US010494017B2

(12) United States Patent
Takase et al.

(10) Patent No.: US 10,494,017 B2
(45) Date of Patent: Dec. 3, 2019

(54) ELECTRIC POWER STEERING APPARATUS

(71) Applicant: NSK LTD., Tokyo (JP)

(72) Inventors: Hiroaki Takase, Tokyo (JP); Ryo Minaki, Tokyo (JP); Hideki Sawada, Tokyo (JP); Takayoshi Sugawara, Tokyo (JP)

(73) Assignee: NSK LTD., Shinagawa-ku, Tokyo (JP)

( * ) Notice: Subject to any disclaimer, the term of this patent is extended or adjusted under 35 U.S.C. 154(b) by 0 days.

(21) Appl. No.: 16/312,723

(22) PCT Filed: Jul. 7, 2017

(86) PCT No.: PCT/JP2017/025006
§ 371 (c)(1),
(2) Date: Dec. 21, 2018

(87) PCT Pub. No.: WO2018/016356
PCT Pub. Date: Jan. 25, 2018

(65) Prior Publication Data
US 2019/0256128 A1 Aug. 22, 2019

(30) Foreign Application Priority Data

Jul. 20, 2016 (JP) .................................. 2016-142623
Sep. 14, 2016 (JP) .................................. 2016-179621

(51) Int. Cl.
*B62D 5/04* (2006.01)
*H02P 27/08* (2006.01)
*H02P 6/08* (2016.01)

(52) U.S. Cl.
CPC .......... *B62D 5/0463* (2013.01); *B62D 5/0481* (2013.01); *H02P 6/08* (2013.01); *H02P 27/08* (2013.01)

(58) Field of Classification Search
CPC ....... B62D 5/0463; B62D 5/0481; H02P 6/08; H02P 27/08
See application file for complete search history.

(56) References Cited

U.S. PATENT DOCUMENTS

2007/0029959 A1 2/2007 Ta et al.
2011/0166750 A1* 7/2011 Nakano .................. B62D 5/046
701/41

(Continued)

FOREIGN PATENT DOCUMENTS

CN 105340173 A 2/2016
JP 2004-080954 A 3/2004

(Continued)

OTHER PUBLICATIONS

International Search Report for PCT/JP2017/025006 dated Oct. 10, 2017 [PCT/ISA/210].

(Continued)

*Primary Examiner* — Sze-Hon Kong
(74) *Attorney, Agent, or Firm* — Sughrue Mion, PLLC

(57) ABSTRACT

An electric power steering apparatus of a vector control system converts calculated dq-axes current command values into 3-phase duty command values, driving-controls a 3-phase brushless motor by an inverter of a PWM control, and applies an assist torque to a steering system of a vehicle, wherein compensation signs of 3-phase current model command values in which the dq-axes current command values are converted into a 3-phase current command value model are estimated, wherein a dead time compensation amount is calculated based on an inverter-applying voltage, and wherein dead time compensation is performed by adding dead time compensation values that are 2-phase values converted from 3-phase values in which the compensation signs are multiplied with the dead time compensation (Continued)

amount, to dq-axes voltage command values, or by adding 3-phase dead time compensation values to 3-phase voltage command values.

11 Claims, 12 Drawing Sheets

(56) References Cited

U.S. PATENT DOCUMENTS

| | | | | |
|---|---|---|---|---|
| 2012/0057381 A1* | 3/2012 | Kimpara | ............... | H02M 3/156 |
| | | | | 363/78 |
| 2013/0190986 A1* | 7/2013 | Nishimori | ............... | B62D 6/00 |
| | | | | 701/41 |
| 2014/0176027 A1* | 6/2014 | Osaki | ............... | H02P 27/08 |
| | | | | 318/400.2 |
| 2015/0251692 A1* | 9/2015 | Mikamo | ............... | B62D 5/0472 |
| | | | | 701/42 |
| 2016/0329853 A1* | 11/2016 | Koseki | ............... | H02P 27/06 |
| 2017/0019052 A1* | 1/2017 | Suzuki | ............... | B62D 5/04 |
| 2017/0070178 A1* | 3/2017 | Koseki | ............... | H02P 27/06 |
| 2017/0259846 A1* | 9/2017 | Koseki | ............... | H02P 29/0243 |
| 2017/0331405 A1* | 11/2017 | Mori | ............... | H02P 21/22 |
| 2017/0366101 A1* | 12/2017 | Suzuki | ............... | H02P 21/22 |
| 2017/0369093 A1* | 12/2017 | Kusatani | ............... | H02P 29/024 |
| 2018/0105201 A1* | 4/2018 | Mori | ............... | H02P 23/00 |
| 2018/0175779 A1* | 6/2018 | Koseki | ............... | H02P 27/06 |
| 2018/0191283 A1* | 7/2018 | Aoyagi | ............... | H02P 21/0089 |
| 2018/0294755 A1* | 10/2018 | Mori | ............... | H02P 21/18 |
| 2019/0023315 A1* | 1/2019 | Takizawa | ............... | H02P 6/28 |
| 2019/0068098 A1* | 2/2019 | Iijima | ............... | H02P 27/08 |

FOREIGN PATENT DOCUMENTS

| | | |
|---|---|---|
| JP | 2004-201414 A | 7/2004 |
| JP | 2007-091182 A | 4/2007 |
| JP | 2010-116159 A | 5/2010 |
| JP | 4681453 B2 | 5/2011 |
| JP | 2012-011965 A | 1/2012 |
| JP | 2012-231615 A | 11/2012 |
| JP | 2012-244735 A | 12/2012 |
| JP | 2014-155333 A | 8/2014 |
| JP | 2015-171251 A | 9/2015 |
| WO | 2005/023626 A1 | 3/2005 |
| WO | 2016027663 A1 | 2/2016 |

OTHER PUBLICATIONS

Written Opinion for PCT/JP2017/025006 dated Oct. 10, 2017 [PCT/ISA/237].

* cited by examiner

PRIOR ART

PRIOR ART

ELECTRIC POWER STEERING APPARATUS

CROSS REFERENCE TO RELATED APPLICATIONS

This application is a National Stage of International Application No. PCT/JP2017/025006 filed Jul. 7, 2017, claiming priority based on Japanese Patent Application Nos. 2016-142623 filed Jul. 20, 2016 and 2016-179621 filed Sep. 14, 2016.

TECHNICAL FIELD

The present invention relates to an electric power steering apparatus that vector-controls a driving of a 3-phase brushless motor using a dq-axes rotational coordinate system, processes a dead time compensation amount, which is calculated at an inverter-applying voltage sensitive-compensation amount calculating section based on a current command value model in which dq-axes current command values are converted into 3-phase currents, by using compensation signs based on the dq-axes current command values, performs a dead time compensation of an inverter by adding the processed dead time compensation amount to the dq-axes voltage command values or 3-phase voltage command values and enables to smoothly assist-control without a steering sound.

BACKGROUND ART

An electric power steering apparatus (EPS) which provides a steering mechanism of a vehicle with a steering assist torque (an assist force) by a rotational force of a motor, applies a driving force of the motor as an actuator to a steering shaft or a rack shaft by means of a transmission mechanism such as gears or a belt through a reduction mechanism. In order to accurately generate the steering assist torque, such a conventional electric power steering apparatus performs a feed-back control of a motor current. The feed-back control adjusts a voltage supplied to the motor so that a difference between a steering assist command value (a current command value) and a detected motor current value becomes small, and the adjustment of the voltage supplied to the motor is generally performed by an adjustment of duty command values of a pulse width modulation (PWM) control.

A general configuration of the conventional electric power steering apparatus will be described with reference to FIG. 1. As shown in FIG. 1, a column shaft (a steering shaft or a handle shaft) 2 connected to a handle (a steering wheel) 1 is connected to steered wheels 8L and 8R through reduction gears 3, universal joints 4a and 4b, a pinion-and-rack mechanism 5, and tie rods 6a and 6b, further via hub units 7a and 7b. In addition, the steering shaft 2 is provided with a steering angle sensor 14 for detecting a steering angle θ and a torque sensor 10 for detecting a steering torque Th of the handle 1, and a motor 20 for assisting the steering torque of the handle 1 is connected to the column shaft 2 through the reduction gears 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist command (a steering assist command) on the basis of the steering torque Th detected by the torque sensor 10 and a vehicle speed Vs detected by a vehicle speed sensor 12, and controls a current supplied to the motor by means of a voltage control command value Vref obtained by performing a compensation or the like to the calculated current command value. A steering angle sensor 14 is not indispensable and may not be provided. It is possible to obtain the steering angle (a motor rotational angle) e from a rotational position sensor such as a resolver which is connected to the motor 20.

A controller area network (CAN) 40 to send/receive various information and signals on the vehicle is connected to the control unit 30, and it is also possible to receive the vehicle speed Vs from the CAN 40. Further, a Non-CAN 41 is also possible to connect to the control unit 30, and the Non-CAN 41 sends and receives a communication, analogue/digital signals, electric wave or the like except for the CAN 40.

In such an electric power steering apparatus, the control unit 30 mainly comprises a central processing unit (CPU) (including a micro processor unit (MPU) and a micro controller unit (MCU)), and general functions performed by programs within the CPU are, for example, shown in FIG. 2.

Functions and operations of the control unit 30 will be described with reference to FIG. 2. The steering torque Th from the torque sensor 10 and the vehicle speed Vs from the vehicle speed sensor 12 are inputted into a steering assist command value calculating section 31. The steering assist command value calculating section 31 calculates a steering assist command value Iref1 based on the steering torque Th and the vehicle speed Vs using an assist map or the like. The calculated steering assist command value Iref1 is added with a compensation signal CM for improving characteristics from a compensating section 34 at an adding section 32A. The steering assist command value Iref2 after addition is limited of the maximum value thereof at a current limiting section 33. The current command value Irefm limited of the maximum value is inputted into a subtracting section 32B, whereat a detected motor current value Im is subtracted from the current command value Irefm.

The subtracted result ΔI (=Irefm−Im) at the subtracting section 32B is current-controlled such as a proportional-integral (PI) control at a PI-control section 35. The voltage control value Vref obtained by the current-control and a modulation signal (a triangle wave carrier) CF are inputted into a PWM-control section 36, whereat a duty thereof is calculated. The motor 20 is PWM-driven by an inverter 37 with a PWM signal calculated the duty. The motor current value Im of the motor 20 is detected by a motor current detection means 38 and is inputted into the subtracting section 32B for the feedback.

The compensating section 34 adds a self-aligning torque (SAT) detected or estimated and an inertia compensation value 342 at an adding section 344. The added result is further added with a convergence control value 341 at an adding section 345. The added result is inputted into the adding section 32A as the compensation signal CM, thereby to improve the control characteristics.

Recently, a 3-phase brushless motor is mainly used for the actuator of the electric power steering apparatus. Since the electric power steering apparatus is an on-vehicle product, the inverter, which drives the motor, in comparison with general industries such as home electric appliances, needs to have a large dead time ("industrial equipment"<"EPS") in view of a wide operating temperature range and a fail-safe. Generally, because a switching device (for example, a field effect transistor (an FET)) has a delay time when turning-OFF, when upper- and lower-arms of the switching devices turn-ON or turn-OFF at the same time, a situation that a direct current (DC) link is short circuit is occurred. In order to prevent from the above case, the time (the dead time), which both the upper- and lower-arms of the switching devices turn-OFF, is set.

As a result, a current waveform is distorted, and a responsibility of the current control and a steering feeling go down. For example, when the driver slowly steers the handle in a situation that the handle is around a straight running state (an on-center state), a discontinuous steering feeling due to the torque ripple or the like is occurred. Since the back-EMF (electromotive force) voltage of the motor in a while speed steering or a high speed steering, and the interference voltage between the windings operate as the disturbance against the current control, a steering follow-up performance and the steering feeling in turn-back steering are badly affected. The steering sound is also louder in the while speed steering or the high speed steering.

A q-axis that controls the torque and is a coordinate axis of a rotor of the 3-phase brushless motor, and a d-axis that controls strength of a magnetic field are independently set. Since the d-axis crosses at 90° against the q-axis, the vector control system that controls the vectors corresponding to the respective axes currents (a d-axis current command value and a q-axis current command value) is known.

FIG. 3 shows a configuration example of driving-controlling the 3-phase brushless motor 100 by using the vector control system. Steering assist command values of a dq-axes coordinate system of the 2-axes are calculated at the steering assist command value calculating section (not shown) based on the steering torque Th, the vehicle speed Vs and so on. The d-axis current command value $i_d^*$ and the q-axis current command value $i_q^*$ whose maximum values are limited are inputted into the subtracting sections 131d and 131q, respectively. Current deviations $\Delta i_d^*$ and $\Delta i_q^*$ that are calculated at the subtracting sections 131d and 131q are inputted into the PI-control sections 120d and 120q, respectively. The voltage command values $v_d$ and $v_q$ that are PI-controlled at the PI-control sections 120d and 120q are inputted into the subtracting section 141d and the adding section 141q, respectively. Command voltages $\Delta v_d$ and $\Delta v_q$ that are calculated at the subtracting section 141d and the adding section 141q are inputted into a dq-axes/3-phase alternating current (AC) converting section 150. The voltage command values Vu*, Vv* and Vw* that are converted into the three phases at the dq-axes/3-phase AC converting section 150 are inputted into the PWM-control section 160. The motor 100 is driven with PWM-signals based on calculated 3-phase duty command values (Duty$_u$, Duty$_v$, Duty$_w$) via the inverter (inverter-applying voltage VR) 161 constituted by a bridge configuration of an upper-arm and a lower-arm as shown in FIG. 4. The upper-arm comprises FETs Q1, Q3, Q5 serving as switching devices and the lower-arm comprises FETs Q2, Q4, Q6.

The 3-phase motor currents $i_u$, $i_v$ and $i_w$ of the motor 100 are detected at the current detectors 162, and the detected 3-phase motor currents $i_u$, $i_v$ and $i_w$ are inputted into the 3-phase AC/dq-axes converting section 130. The 2-phase feedback currents $i_d$ and $i_q$ that are converted at the 3-phase AC/dq-axes converting section 130 are subtraction-inputted into the subtracting sections 131d and 131q and a d-q non-interference control section 140. The rotational sensor or the like is attached to the motor 100, and the motor rotational angle θ and the motor rotational number (the rotational velocity) ω are outputted from the angle detecting section 110 that processes a sensor signal. The motor rotational angle θ is inputted into the dq-axes/3-phase AC converting section 150 and the 3-phase AC/dq-axes converting section 130, and the motor rotational number ω is inputted into the d-q non-interference control section 140. Two-phase voltages $v_{d1}^*$ and $v_{q1}^*$ from the d-q non-interference control section 140 are inputted into the subtracting section 141d and the adding section 141q, respectively, and the command voltages $\Delta v_d$ and $\Delta v_q$ are calculated at the subtracting section 141d and the adding section 141q. The command voltages $\Delta v_d$ and $\Delta v_q$ are inputted into the dq-axes/3-phase AC converting section 150.

The electric power steering apparatus of the vector control system described above is an apparatus to assist the steering of the driver, and also a sound and a vibration of the motor, a torque ripple and the like are transmitted to the driver as a force sense via the steering wheel. The FETs are generally used as the power devices to drive the inverter, and the current is applied to the motor. In a case that the 3-phase motor is used, FETs, which are connected in series for respective phases, of the upper-arm and the lower-arm are used as shown in FIG. 4. Although the FETs of the upper-arm and the lower-arm are alternatively turned-ON and turned-OFF, the FETs do not simultaneously turn-ON and turn-OFF in accordance with the gate signals since the FET is not an ideal switching device. Therefore, a turn-ON time and a turn-OFF time are needed. Consequently, if an ON-command for the upper-arm FET and an OFF-command for the lower-arm FET are simultaneously inputted, there is a problem that the upper-arm FET and the lower-arm FET simultaneously turn-ON and the upper-arm and the lower-arm become short circuits. There is a difference between the turn-ON time and the turn-OFF time of the FET. Thus, when the command is inputted into the FETs at the same time, the FET immediately turns-ON in a case that the turn-ON time is short (for example, 100 [ns]) by inputting the ON-command to the upper-FET, and reversely, the FET does not immediately turn-OFF in a case that the turn-OFF time is long (for example, 400 [ns]) by inputting the OFF-command to the lower-FET. In this way, a state (for example, between 400 [ns]-100 [ns], ON-ON) that the upper-FET is "ON" and the lower FET is "ON", often momentarily occurs.

In this connection, in order that the upper-arm FET and the lower-arm FET do not simultaneously turn-ON, the ON-signal is usually given to the gate driving circuit with a predetermined period being a dead time. Since the dead time is nonlinear, the current waveform is distorted, the responsibility of the control is badly affected and the sound, the vibration and the torque ripple are generated. In a column type electric power steering apparatus, since an arrangement of the motor directly connected to a gear box which is connected by the handle and the column shaft made of steel is extremely near the driver in the mechanism, it is necessary to especially consider the sound, the vibration, the torque ripple and the like due to the motor in comparison with a downstream type electric power steering apparatus.

Conventionally, as a method to compensate the dead time of the inverter, there are methods to add the compensation value to the dead time by detecting a timing occurring the dead time and to compensate the dead time by using a disturbance observer on the dq-axes in the current control.

The electric power steering apparatus to compensate the dead time is disclosed in, for example, Japanese Patent No. 4681453 B2 (Patent Document 1) and Japanese Unexamined Patent Publication No. 2015-171251 A (Patent Document 2). In Patent Document 1, there is provided a dead band compensation circuit that generates a model current based on the current command values by inputting the current command values into a reference model circuit of the current control loop including the motor and the inverter, and compensates the influence of the dead time of the inverter based on the model current. Further, in Patent Document 2, there is provided a dead time compensating section to correct based on the dead time compensation value for the duty command value, and the dead time compensating section comprises a basic compensation value calculating section to calculate a basic compensation value being a basic value of the dead time compensation value based on the current command value and a filtering section to perform a filtering-process corresponding to a low pass filter (LPF) for the basic compensation value.

THE LIST OF PRIOR ART DOCUMENTS

Patent Documents

Patent Document 1: Japanese Patent No. 4681453 B2
Patent Document 2: Japanese Unexamined Patent Publication No. 2015-171251 A

SUMMARY OF THE INVENTION

Problems to be Solved by the Invention

The apparatus disclosed in Patent Document 1 is a system that estimates the compensation sign by using a calculation of the dead time compensation amount due to the q-axis current command value and the 3-phase current reference model. The output value of the compensation circuit is a changing value in proportion to the model current in a region being a predetermined fixed value or less, and is an added value of the changing values in proportion to the fixed value and the model current in a region being the predetermined fixed value or more. In this way, the output value of the compensation circuit is outputted from the current command to the voltage command. However, the tuning operation for determining the hysteresis characteristic to output the predetermined fixed value is necessary.

Further, in the apparatus disclosed in Patent Document 2, when the dead time is determined, the dead time compensation is performed by using the q-axis current command value and the compensation value LPF-processed the q-axis current command value. Thus, the delay occurs, and there is a problem that the dead time compensation value is not operated for the final voltage command to the motor.

The present invention has been developed in view of the above-described circumstances, and an object of the present invention is to provide the electric power steering apparatus of the vector control system that compensates the dead time of the inverter without the tuning operation, improves the distortion of the current waveform and the responsibility of the current control, and suppresses the sound, the vibration and the torque ripple of the motor.

Means for Solving the Problems

The present invention relates to an electric power steering apparatus of a vector control system that converts dq-axes current command values calculated based on at least a steering torque into 3-phase duty command values, driving-controls a 3-phase brushless motor by an inverter of a pulse width modulation (PWM) control, and applies an assist torque to a steering system of a vehicle, the above-described object of the present invention is achieved by that: wherein compensation signs of 3-phase current model command values in which the dq-axes current command values are converted into a 3-phase current command value model are estimated, wherein a dead time compensation amount is calculated based on an inverter-applying voltage, and wherein a dead time compensation of the inverter is performed by adding dead time compensation values that are 2-phase values converted from 3-phase values in which the compensation signs are multiplied with the dead time compensation amount, to dq-axes voltage command values.

Further, the present invention relates to an electric power steering apparatus of a vector control system that converts dq-axes current command values calculated based on at least a steering torque into 3-phase voltage command values, calculates duty command values based on the 3-phase voltage command values, driving-controls a 3-phase brushless motor by an inverter of a pulse width modulation (PWM) control, and applies an assist torque to a steering system of a vehicle, the above-described object of the present invention is achieved by that: wherein compensation signs of 3-phase current model command values in which the dq-axes current command values are converted into a 3-phase current command value model are estimated, wherein a dead time compensation amount is calculated based on an inverter-applying voltage, and wherein a dead time compensation of the inverter is performed by adding 3-phase values that the compensation signs are multiplied with the dead time compensation amount, to the 3-phase voltage command values.

Effects of the Invention

The electric power steering apparatus according to the present invention compensates the dead time by converting the dq-axes current command values into the 3-phase current model command values, estimating the compensation signs, calculating the dead time compensation amount of the inverter, which is calculated from the inverter-applying voltage, converting the dead time compensation values by the estimated compensation signs into the 2-phase values and adding (feedforwarding) the 2-phase values to the voltage command values on the dq-axes, or adding (feedforwarding) the dead time compensation values by the estimated compensation signs to the 3-phase voltage command values. Thereby, without the tuning operation, the dead time of the inverter is compensated on the dq-axes or the three phases, and improvements in the distortion of the current waveform and the responsibility of the current control can be achieved.

Since the control is smoothly performed by the feedforward compensation of the dead time based on the dq-axes current command values, the noisy sound and the vibration of the motor, and the torque ripple can be suppressed. The present invention has an advantage that the small phase shift (deviation) is realized even in the high speed steering region and the compensation is simply performed. Since the compensation method is not changed even in the d-axis control, the compensation can simply be performed.

In a case that the d-axis control is considered, the logic may be switched depending on the condition whether the d-axis current command value is existed or not, and the logic dedicated for the d-axis may compensate the dead time. In the present invention, since the calculation of the current command value model includes the d-axis current command value, in a case that the d-axis current command value is not existed, the 3-phase current model command values calculated under the condition that the d-axis current command value is equal to zero, are outputted. In a case that the d-axis current command value is not equal to zero, since the 3-phase current model command values are outputted depending on the d-axis current command value and the q-axis current command value, the logic dedicated for the d-axis is not required. Since the calculation method is not changed depending on whether the d-axis current command value is existed or not, neither the switch of the logic nor the additional logic is required. The simple compensation can be performed.

MODE FOR CARRYING OUT THE INVENTION

In order to resolve a problem that a current distortion and a torque ripple occur due to an influence of a dead time of an inverter in a control unit (ECU) and a steering sound is louder, the present invention compensates the dead time by converting dead time compensation values into 3-phase current model command values based on dq-axes current command values, estimating compensation signs, calculating a dead time compensation amount of the inverter calculated from an inverter-applying voltage, and converting the dead time compensation values compensated by the estimated compensation signs into 2-phase values and adding (feedforwarding) the 2-phase values to a voltage command values on the dq-axes (the first embodiment), or adding (feedforwarding) the dead time compensation values compensated by the estimated compensation signs to the 3-phase voltage command values (the second embodiment). Thereby, without the tuning operation, the dead time of the inverter is compensated on the dq-axes or the 3-phase alternative current (AC), and improvements in the distortion of the current waveform and the responsibility of the current control can be achieved.

Embodiments according to the present invention will be described with reference to the drawings.

Figure 1:
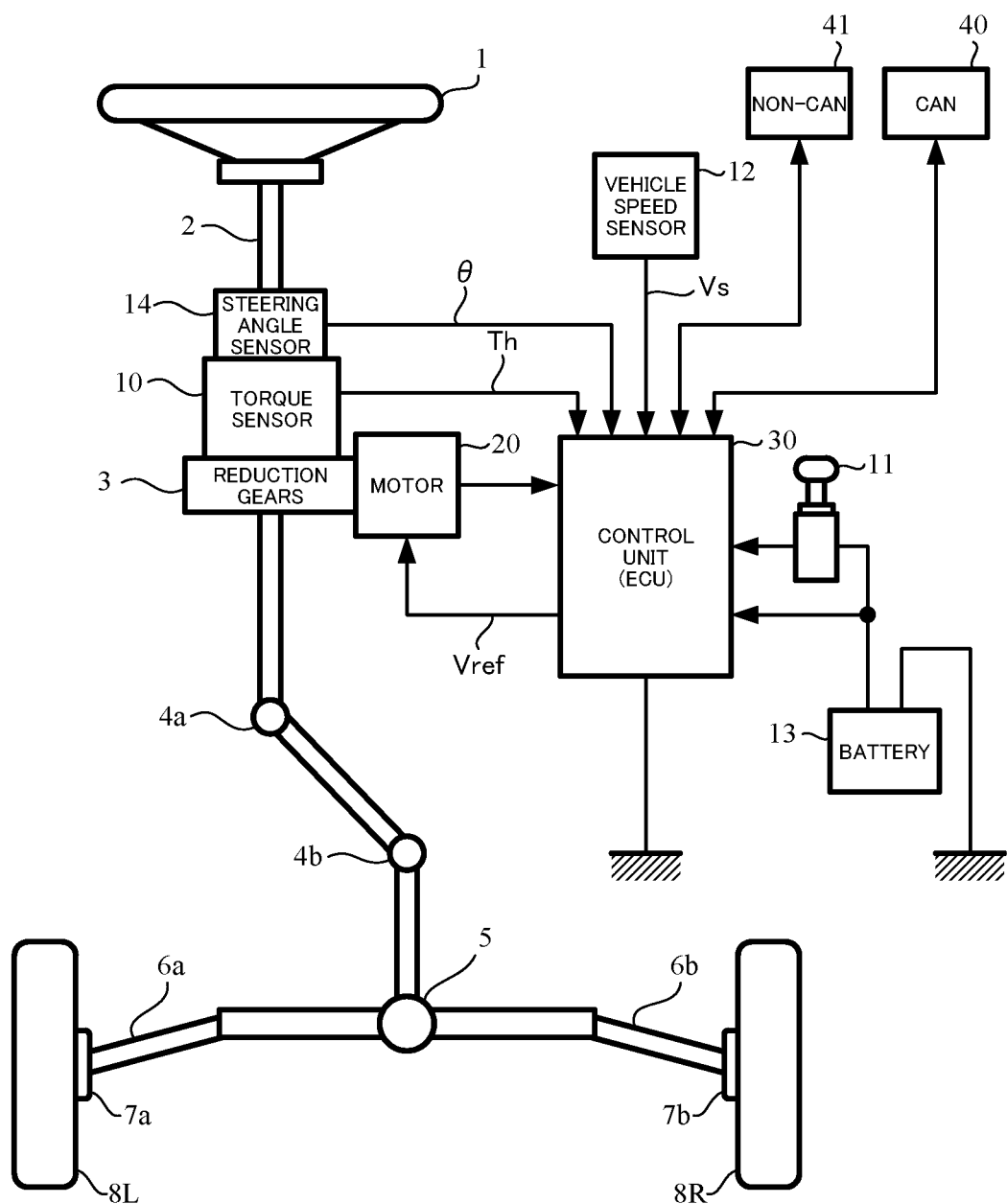
FIG. 1 is a configuration diagram showing a general outline of an electric power steering apparatus.
Figure 2:
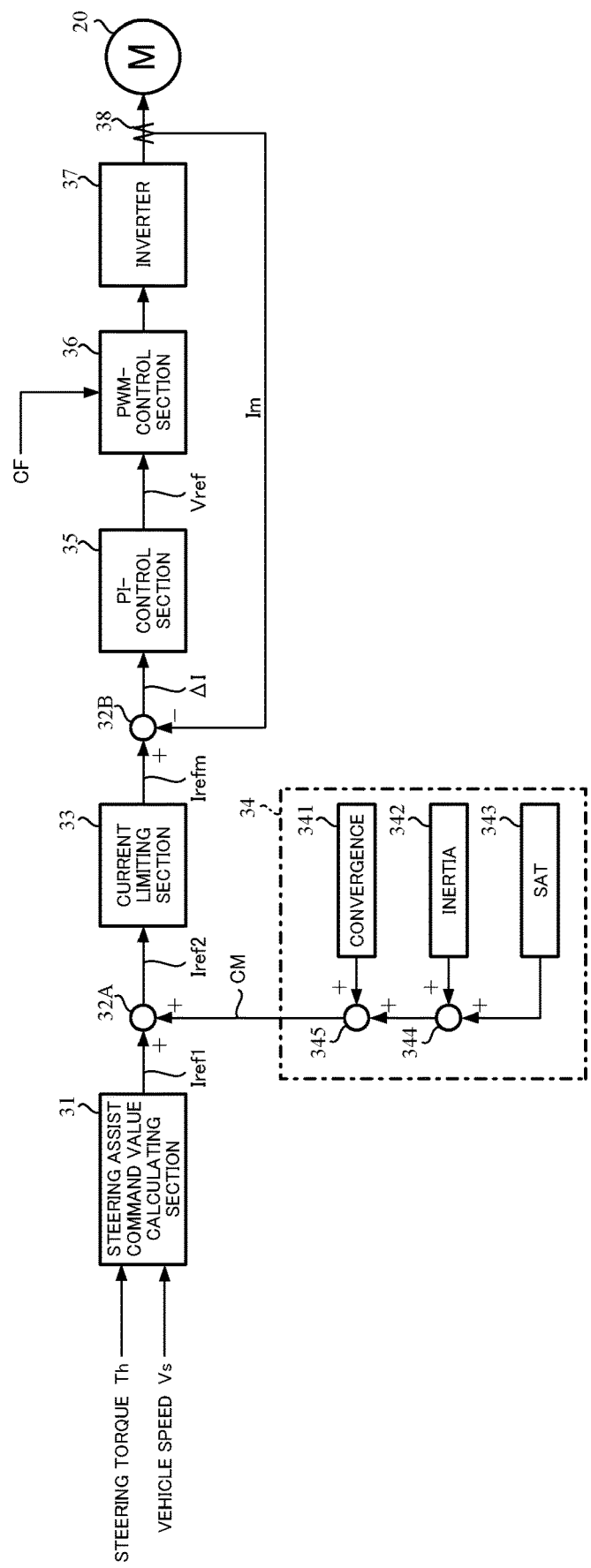
FIG. 2 is a block diagram showing a configuration example of a control unit (ECU) of the electric power steering apparatus.
Figure 3:
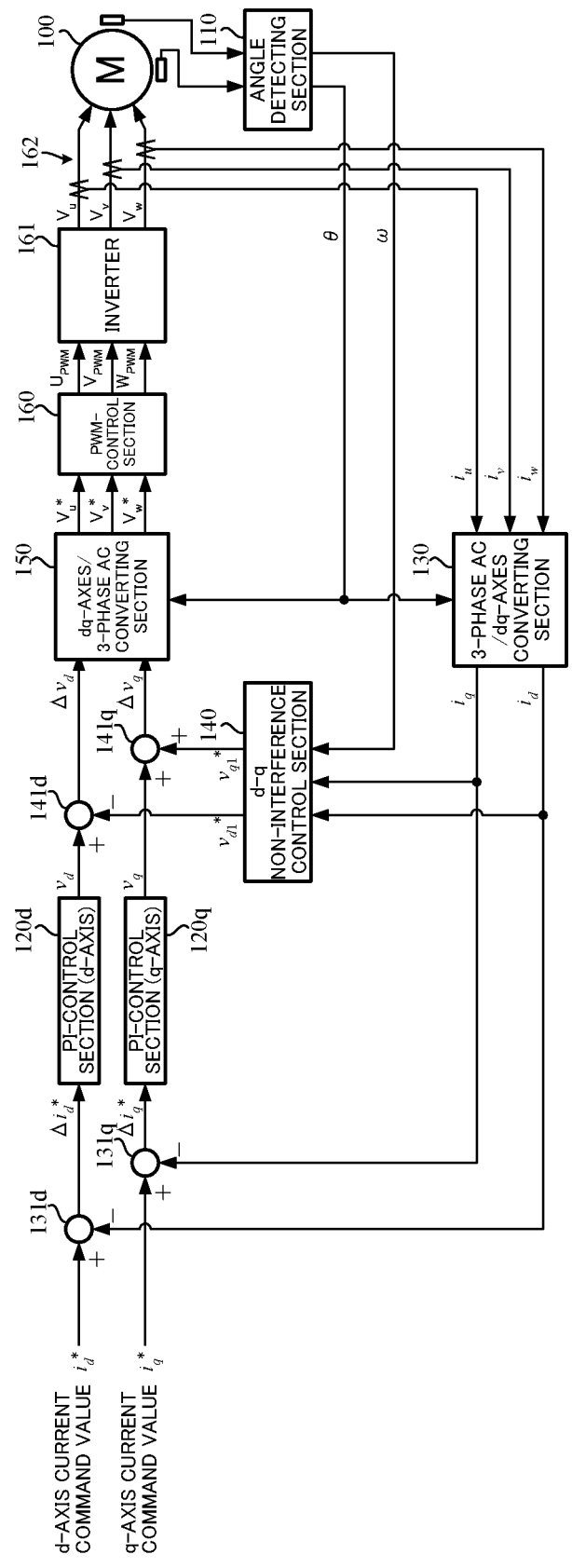
FIG. 3 is a block diagram showing a configuration example of a vector control system.
Figure 4:
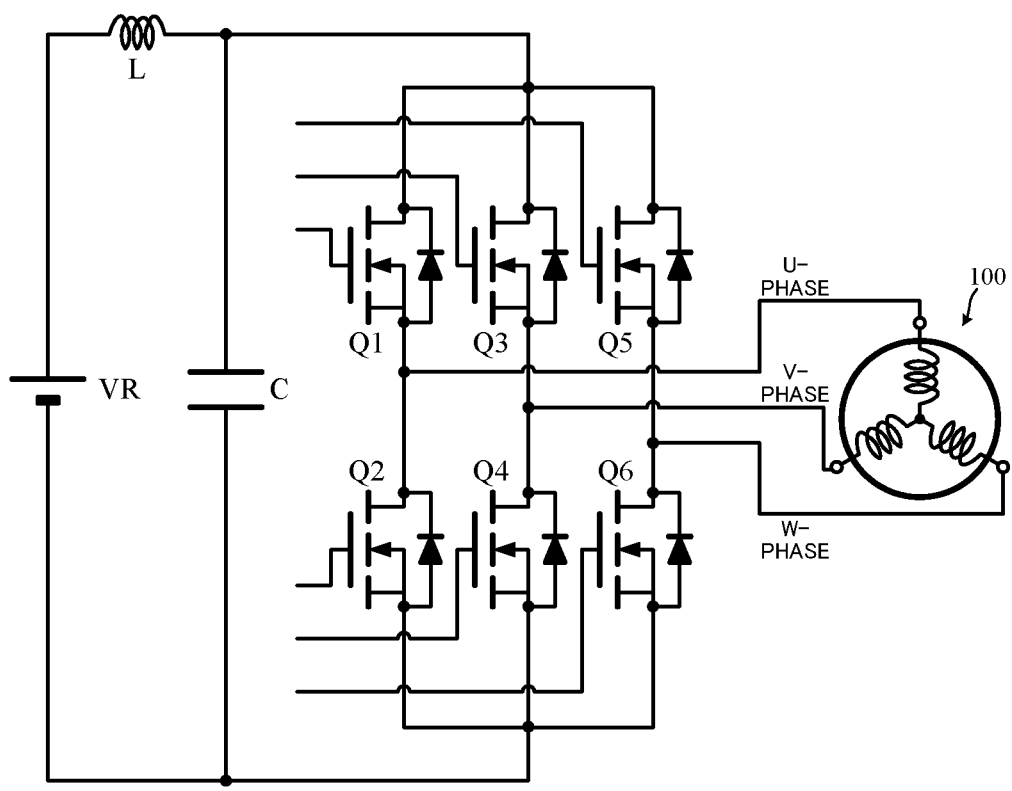
FIG. 4 is a wiring diagram showing a configuration example of a general inverter.
Figure 5:
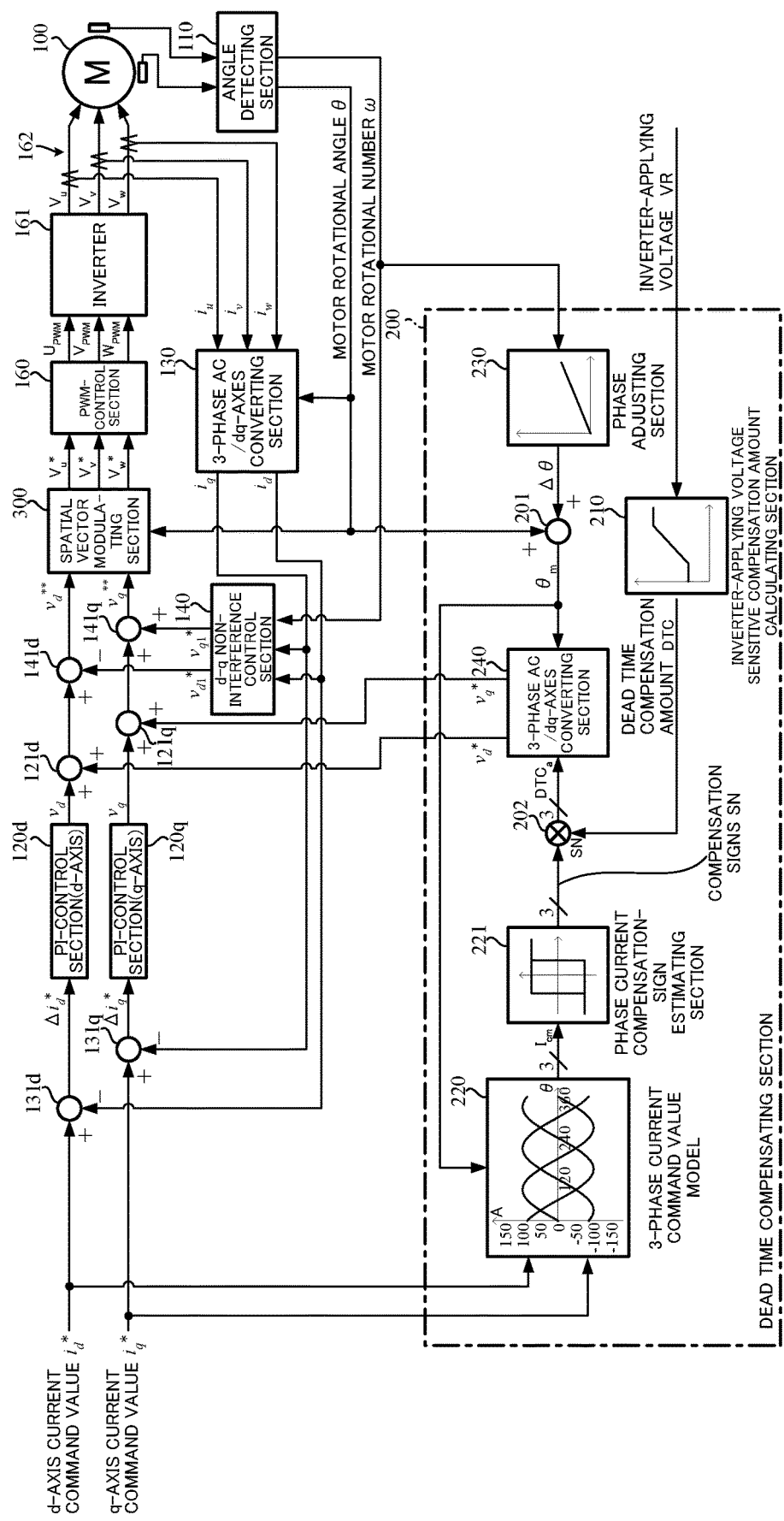
FIG. 5 is a block diagram showing a configuration example (the first embodiment) of the present invention.

FIG. 5 shows a whole configuration example (the first embodiment) of the present invention corresponding to FIG. 3, and there is provided a dead time compensating section 200 to calculate dead time compensation values $v_d^*$ and $v_q^*$ on the dq-axes. A d-axis current command value $i_d^*$, a q-axis current command value $i_q^*$, a motor rotational angle $\theta$ and a motor rotational number $\omega$ are inputted into the dead time compensating section 200. An inverter-applying voltage VR applied to the inverter 161 is also inputted into the dead time compensating section 200.

The d-axis current command value $i_d^*$ and the q-axis current command value $i_q^*$ in which the maximum values of steering assist command values calculated at a steering assist command value calculating section (not shown) are limited, are inputted into subtracting sections 131d and 131q, respectively. A current deviation $\Delta i_d^*$ between the d-axis current command value $i_d^*$ and a feedback current $i_d$ is calculated at the subtracting section 131d, and a current deviation $\Delta i_q^*$ between the q-axis current command value $i_q^*$ and a feedback current $i_q$ is calculated at the subtracting sections 131q. The calculated current deviation $\Delta i_d^*$ is inputted into a PI-control section 120d and the calculated current deviation $\Delta i_q^*$ is inputted into a PI-control section 120q. A d-axis voltage command value $v_d$ and a q-axis voltage command value $v_q$ which are PI-controlled are respectively inputted into adding sections 121d and 121q, and are respectively added to the dead time compensation values $v_d^*$ and $v_q^*$ from the dead time compensating section 200 as described below. The d-axis voltage command value $v_d$ and the q-axis voltage command value $v_q$ are compensated. The respective compensated voltage values are respectively inputted into a subtracting section 141d and an adding section 141q. A voltage $v_{d1}^*$ from a d-q non-interference control section 140 is subtraction-inputted into the subtracting section 141d. A voltage command value $v_d^{**}$ that is a difference between the compensated voltage and the voltage $v_{d1}^*$ is obtained. A voltage $v_{q1}^*$ from the d-q non-interference control section 140 is inputted into the adding section 141q. A voltage command value $v_q^{}$ that is an added result is obtained. The voltage command values $v_d^{}$ and $v_q^{**}$ that the dead time is compensated are inputted into a spatial vector modulating section 300 that converts the 2-phase voltage command values on the dq-axes into the 3-phase voltage command values whose components are a U-phase, a V-phase and a W-phase, and superimposes a third-harmonic wave. The 3-phase voltage command values $V_u^*$, $V_v^*$ and $V_w^*$ which are vector-modulated at the spatial vector modulating section 300 are inputted into a PWM-control section 160. As described above, a motor 100 is driving-controlled via the PWM-control section 160 and the inverter 161.

Next, the dead time compensating section 200 will be described.

The dead time compensating section 200 comprises an adding section 201, a multiplying section 202, an inverter-applying voltage sensitive-compensation amount calculating section 210, a 3-phase current command value model 220, a phase current compensation-sign estimating section 221, a phase adjusting section 230 and a 3-phase AC/dq-axes converting section 240. As well, the multiplying section 202 and the 3-phase AC/dq-axes converting section 240 constitute a dead time compensation-value outputting section. The motor rotational angle θ is inputted into the adding section 201 and the motor rotational number ω is inputted into the phase adjusting section 230. The inverter-applying voltage VR is inputted into the inverter-applying voltage sensitive-compensation amount calculating section 210. A motor rotational angle θm that is calculated and is phase-adjusted at the adding section 201 is inputted into the 3-phase current command value model 220.

Figure 6:
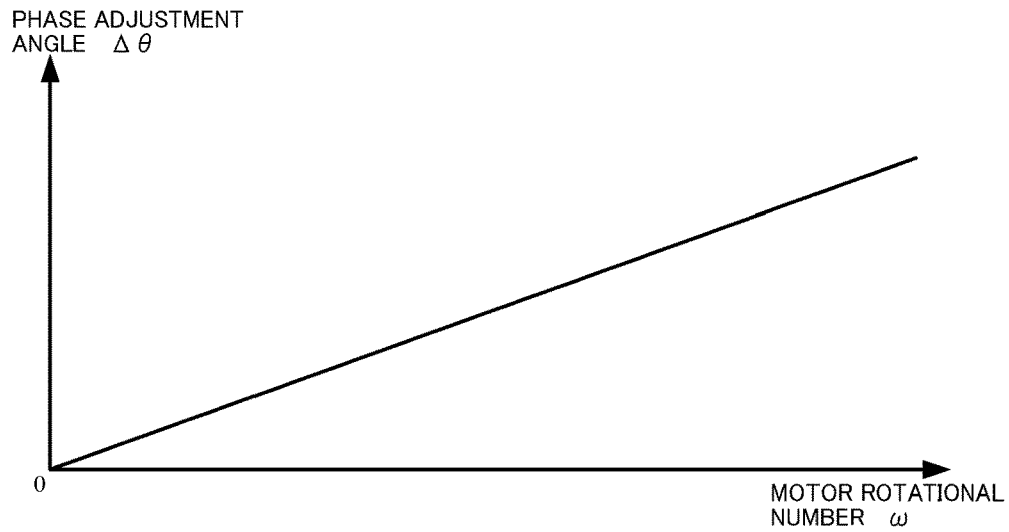
FIG. 6 is a characteristic diagram showing an example of a characteristic of a phase adjusting section.

In a case that the dead time compensation timing is hastened or is delayed in response to the motor rotational number co, the phase adjusting section 230 has a function to calculate the adjustment angle Δθ depending on the motor rotational number co. The phase adjusting section 230 has a characteristic as shown in FIG. 6 in a case of a lead angle control. The calculated phase adjustment angle Δθ is inputted into the adding section 201 and is added to the motor rotational angle θ. The phase-adjusted motor rotational angle θm (=θ+Δθ) that is an added result of the adding section 201 is inputted into the 3-phase current command value model 220 and the 3-phase AC/dq-axes converting section 240.

After detecting a motor electric angle and then calculating the duty command values, a time delay whose time is several tens of microseconds to one hundred microseconds is existed until actually reflecting the PWM-signals. Since the motor is rotating during the delay time, a phase shift between the motor electric angle in the calculation and the motor electric angle in the reflection is generated. In order to compensate this phase shift, the lead angle is performed depending on the motor rotational number co and the phase is adjusted.

Figure 7:
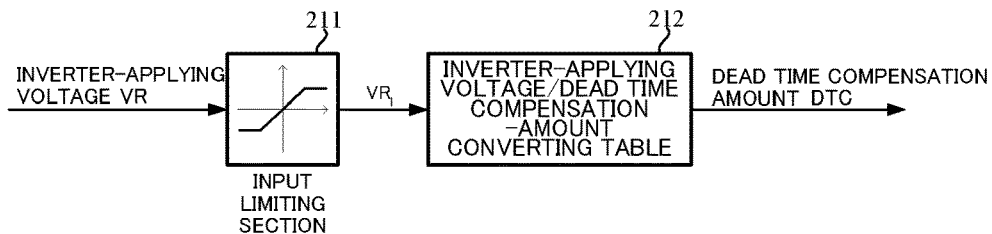
FIG. 7 is a block diagram showing a configuration example of an inverter-applying voltage sensitive-compensation amount calculating section.

Since the optimal dead time compensation amount is changed depending on the inverter-applying voltage VR, the dead time compensation amount DTC is calculated depending on the inverter-applying voltage VR and is changeable in the present invention. The inverter-applying voltage sensitive-compensation amount calculating section 210 that inputs the inverter-applying voltage VR and outputs the dead time compensation amount DTC has a configuration as shown in FIG. 7. The maximum value of an absolute value of the inverter-applying voltage VR is limited at an input limiting section 211. The inverter-applying voltage $VR_1$ whose maximum value is limited is inputted into an inverter-applying voltage/dead time compensation-amount converting table 212.

Figure 8:
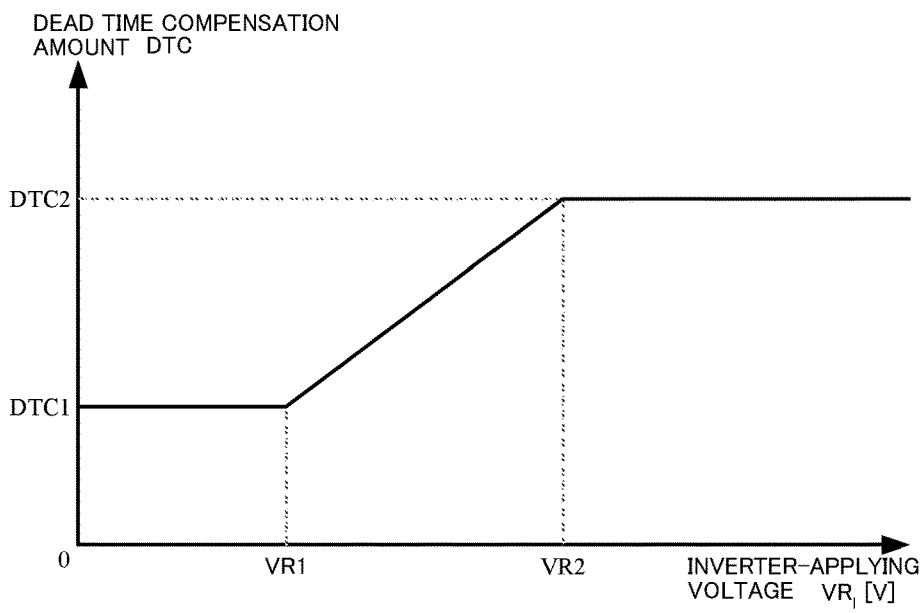
FIG. 8 is a characteristic diagram showing a characteristic example of the inverter-applying voltage sensitive-compensation amount calculating section.

The inverter-applying voltage/dead time compensation-amount converting table 212 has a characteristic, for example, as shown in FIG. 8. That is, the outputted dead time compensation amount DTC is a constant value DTC1 when the inverter-applying voltage $VR_1$ is less than a predetermined inverter-applying voltage VR1. The outputted dead time compensation amount DTC linearly (or nonlinearly) increases when the inverter-applying voltage $VR_1$ is the predetermined inverter-applying voltage VR1 or more and is less than a predetermined inverter-applying voltage VR2 (>VR1). The outputted dead time compensation amount DTC is a constant value DTC2 when the inverter-applying voltage $VR_1$ is the predetermined inverter-applying voltage VR2 or more.

Figure 9:
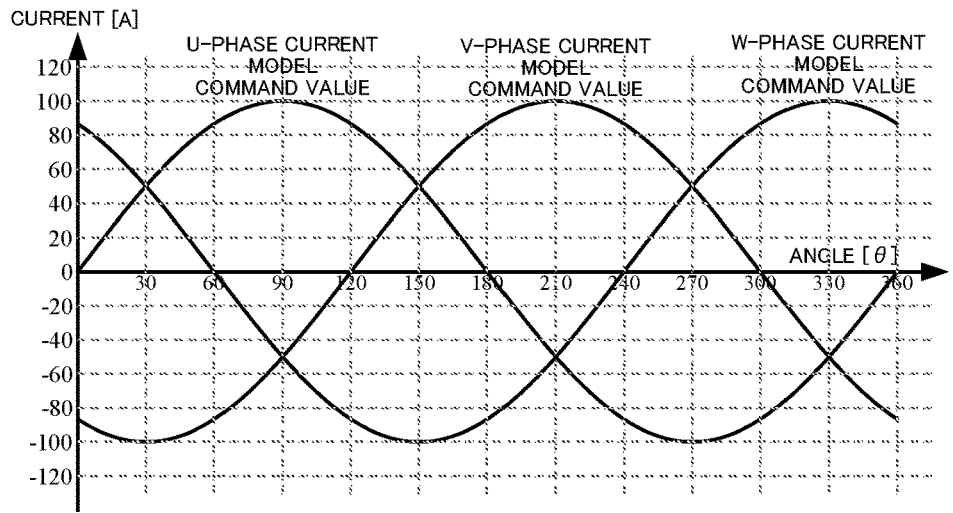
FIG. 9 is a waveform chart showing an example of an output waveform of a 3-phase current command value model.

The d-axis current command value $i_d^*$ and the q-axis current command value $i_q^*$ are inputted into the 3-phase current command value model 220 with the motor rotational angle θm. The 3-phase current command value model 220 calculates the sinusoidal 3-phase current model command values Icm that respective phases deviate 120 [deg] as shown in FIG. 9, by a calculation or using a table (refer to following Expressions 1 and 2). The 3-phase current model command values Icm are different depending on the motor type. The d-axis current command value $i_{ref\_d}$ and the q-axis current command value $i_{ref\_q}$ are converted into the 3-phase current command values (U-phase, V-phase and W-phase) using the motor electric angle θe. The above relationship is represented by the below Expression 1.

$$\begin{bmatrix} i_{\text{ref\_u}} \\ i_{\text{ref\_v}} \\ i_{\text{ref\_w}} \end{bmatrix} = \begin{bmatrix} \cos(\theta_e) & \sin(\theta_e) \\ \cos\left(\theta_e - \frac{2}{3}\pi\right) & \sin\left(\theta_e - \frac{2}{3}\pi\right) \\ \cos\left(\theta_e + \frac{2}{3}\pi\right) & \sin\left(\theta_e + \frac{2}{3}\pi\right) \end{bmatrix} \begin{bmatrix} i_{\text{ref\_d}} \\ i_{\text{ref\_q}} \end{bmatrix} \quad \text{[Expression 1]}$$

The respective current command values are calculated from the above Expression 1, and the U-phase current command value model $i_{ref\_u}$, the V-phase current command value model $i_{ref\_v}$ and the W-phase current command value model $i_{ref\_w}$ are represented by the below Expression 2.

$$i_{\text{ref\_u}} = i_{\text{ref\_d}} \cdot \cos(\theta_e) + i_{\text{ref\_q}} \cdot \sin(\theta_e) \quad \text{[Expression 2]}$$

$$i_{\text{ref\_v}} = i_{\text{ref\_d}} \cdot \cos\left(\theta_e - \frac{2}{3}\pi\right) + i_{\text{ref\_q}} \cdot \sin\left(\theta_e - \frac{2}{3}\pi\right)$$

$$i_{\text{ref\_w}} = i_{\text{ref\_d}} \cdot \cos\left(\theta_e + \frac{2}{3}\pi\right) + i_{\text{ref\_q}} \cdot \sin\left(\theta_e + \frac{2}{3}\pi\right)$$

The table may be stored in an electrically erasable and programmable read-only memory (EEPROM) or may be loaded to a random access memory (RAM). In using the Expression 2, the values of sine are stored in the table. The values of cos θ may be calculated by offsetting the input θ to 90° and other sine function terms may be calculated by offsetting the input θ to 120°. In a case that the ROM capacity is sufficiently large or the command value model is complicated (for example, a pseudo rectangular wave motor), the values of the overall Expression 2 are stored in the table.

Figure 10A:
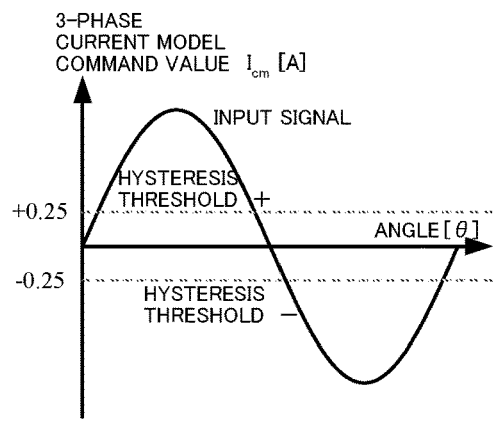
FIGS. 10A and 10B are waveform charts showing operation examples of a phase current compensation-sign estimating section.
Figure 10B:
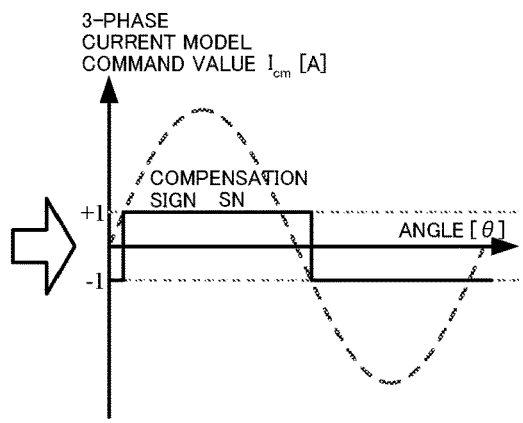

The 3-phase current model command values Icm are inputted into the phase current compensation-sign estimating section 221. The phase current compensation-sign estimating section 221 outputs compensation signs SN, which have a positive value (+1) or a negative value (−1) and indicates a hysteresis characteristic shown in FIGS. 10A and 10B, against the inputted 3-phase current model command values Icm. The compensation signs SN are estimated based on zero-cross points of the 3-phase current model command values Icm as a reference. In order to suppress the chattering, the compensation signs SN have the hysteresis characteristic. The estimated compensation signs SN are inputted into the multiplying section 202. The positive and negative thresholds of the hysteresis characteristic are appropriately changeable.

In a case that the signs of the dead time compensation values are simply determined from the current signs of the phase current command value model, the chattering is occurred in the low load. For example, when the handle is slightly steered to the left or the right near the on-center, the torque ripple is occurred. In order to improve this problem, the hysteresis is adopted in the sign judgement (±0.25 [A] in FIG. 10A). The current signs are held except for a case that the signs are changed beyond the set current value, and the chattering is suppressed.

The dead time compensation amount DTC from the inverter-applying voltage sensitive-compensation amount calculating section 210 is inputted into the multiplying section 202. The multiplying section 202 outputs the dead time compensation amounts DTCa (=DTC×SN) that the compensation signs SN are multiplied with the dead time compensation amount DTC. The dead time compensation amounts DTCa are inputted into the 3-phase AC/dq-axes converting section 240. The 3-phase AC/dq-axes converting section 240 outputs the 2-phase dead time compensation values $v_d^*$ and $v_q^*$ in synchronization with the motor rotational angle θm. The dead time compensation value $v_d^*$ and $v_q^*$ are added to the voltage command values $v_d$ and $v_q$, respectively, and the dead time compensation of the inverter 161 is performed.

In the present invention, the dq-axes current command values are converted into the 3-phase current model command values, and the compensation signs are estimated. The dead time compensation amount of the inverter calculated from the inverter-applying voltage VR is calculated, and the voltage command values on the dq-axes are feedforward-compensated by the dead time compensation values calculated from the estimated compensation signs. The 3-phase current model command values are used in the compensation signs of the dead time, and the dead time compensation amount is calculated from the inverter-applying voltage VR. The compensation values are changeable so that the magnitudes and directions of the compensation values are optimal depending on the magnitude of the current command values ($i_d^*$ and $i_q^*$) and the magnitude of the inverter-applying voltage VR.

Figure 11:
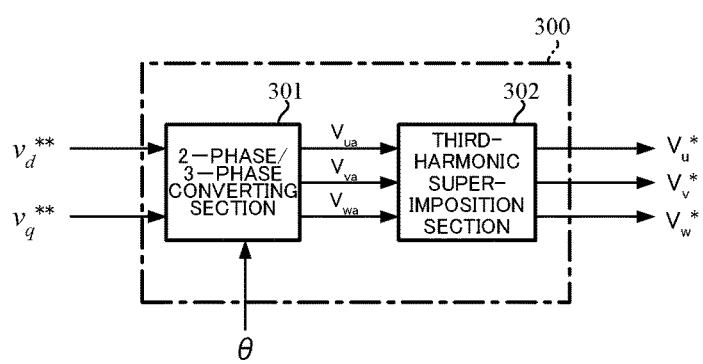
FIG. 11 is a block diagram showing a configuration example of a spatial vector modulating section.

Next, the spatial vector modulation will be described. As shown in FIG. 11, the spatial vector modulating section 300 may have a function that converts the 2-phase voltages $v_d^{}$ and $v_q^{}$ in the d-q spaces into the 3-phase voltages $V_{ua}$, $V_{va}$ and $V_{wa}$, and superimposes the third harmonic wave on the 3-phase voltages $V_{ua}$, $V_{va}$ and $V_{wa}$. For example, the method of the spatial vector modulation that the applicant proposes in Japanese Unexamined Patent Publication No. 2017-70066, WO2017/098840 (Japanese Patent Application No. 2015-239898) and the like may be used.

Figure 12:
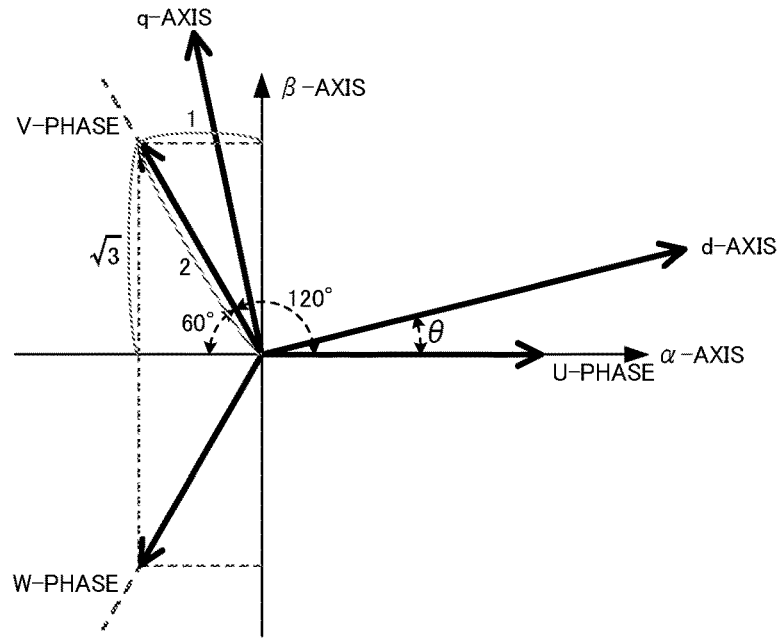
FIG. 12 is a diagram showing an operation example of the spatial vector modulating section.

That is, the spatial vector modulation has a function that performs a following coordinate transformation based on the voltage command values $v_d^{}$ and $v_q^{}$ in the d-q spaces, the motor rotational angle θ and sector number n (#1 to #6), and controls the rotation of the motor by supplying switching patterns S1 to S6 to the motor. The switching patterns S1 to S6 are corresponding to the sectors #1 to #6, and control turning-ON/turning-OFF of the switching devices (the upper-arm Q1, Q3 and Q5, and the lower-arm Q2, Q4 and Q6) of the inverter with the bridge configuration. With reference to the coordinate transformation, in the spatial vector modulation, the voltage command values $v_d^{}$ and $v_q^{}$ perform the coordinate transformation to the voltage vectors Vα and Vβ in the α-β coordinate system based on a below Expression 3. A relationship between the coordinate axes that are used in this coordinate transformation and the motor rotational angle θ is shown in FIG. 12.

$$\begin{bmatrix} V\alpha \\ V\beta \end{bmatrix} = \begin{bmatrix} \cos\theta & -\sin\theta \\ \sin\theta & \cos\theta \end{bmatrix} \begin{bmatrix} v_d^{} \\ v_q^{} \end{bmatrix} \quad \text{[Expression 3]}$$

A relationship shown in an Expression 4 between a target voltage vector in the d-q coordinate system and a target voltage vector in the α-β coordinate system is existed. The absolute value of the target voltage vector is conserved.

$$|V| = \sqrt{(v_d^{})^2 + (v_q^{})^2} = \sqrt{V\alpha^2 + V\beta^2}$$

Figure 13:
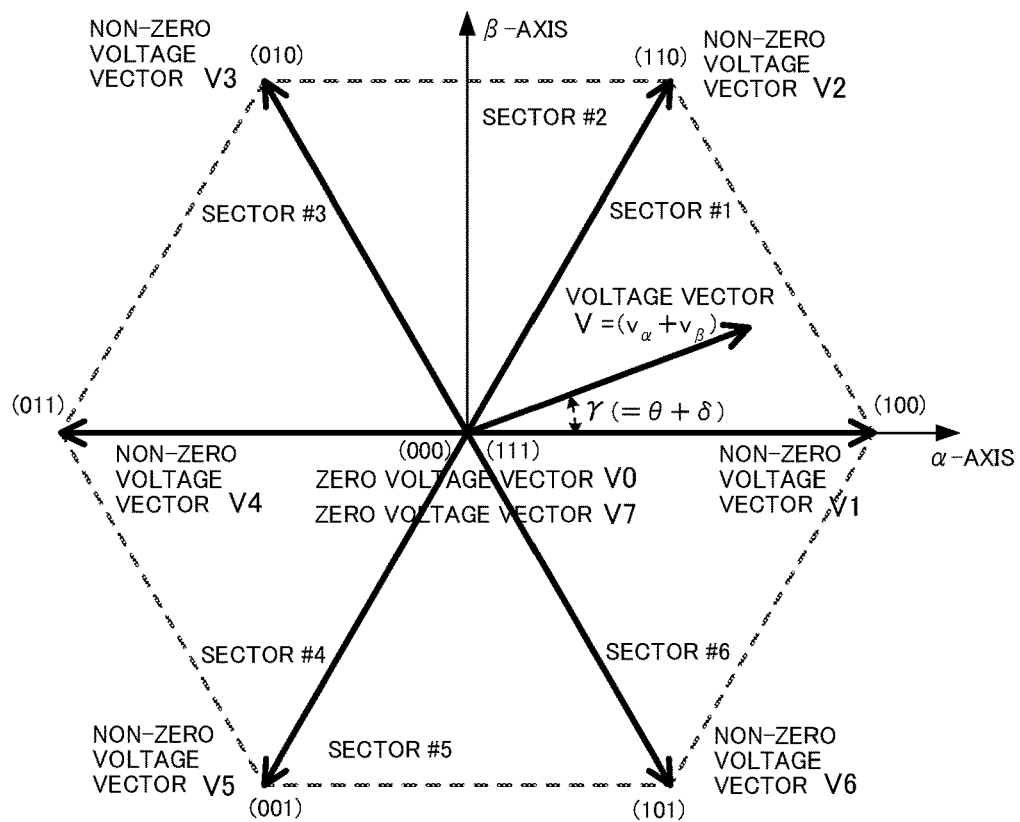
FIG. 13 is a diagram showing an operation example of the spatial vector modulating section.

In the switching pattern of the spatial vector control, the output voltage is defined by using eight discrete reference voltage vectors V0 to V7 (non-zero voltage vectors V1 to V6 that the phase differs every π/3 [rad] and zero voltage vectors V0 and V7) that are shown in the spatial vector diagram of FIG. 13, depending on the switching patterns S1 to S6 of the switching devices (the FETs) (Q1 to Q6). The selection of these reference output voltage vectors V0 to V7 and the occurring time are controlled. By using six regions sandwiched between adjacent reference output voltage vectors, the space vector can be divided into the six sectors #1 to #6, and the target voltage vector V is belong to any one of the sectors #1 to #6, and can be assigned to the sector number. The rotational angle γ in the α-β coordinate system of the target voltage vector V can determine which sector that is separated into a regular hexagon in the α-β spaces, as shown in FIG. 13, is existed in the target voltage vector V that is a synthetic vector of Vα and Vβ. The rotational angle γ is determined by a sum of the rotational angle θ of the motor and a phase δ obtained from the relationship of the voltage command values $v_d^{}$ and $v_q^{}$ in the d-q coordinate system (γ=θ+δ).

Figure 14:
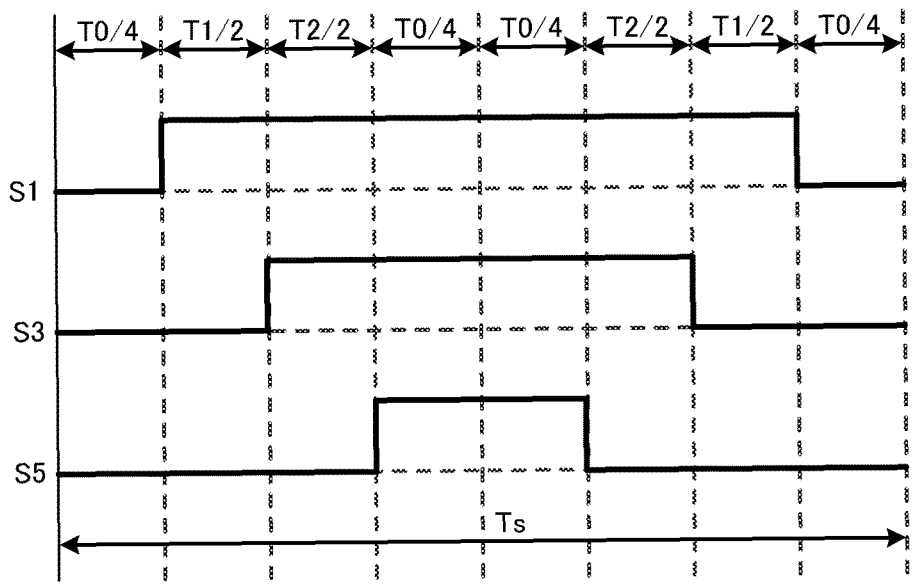
FIG. 14 is a timing chart showing an operation example of the spatial vector modulating section.

FIG. 14 shows a basic timing chart that the switching pulse width and the timing in the turning-ON/turning-OFF signals S1 to S6 to the switching devices (the FETs) are determined in order to output the target voltage vector from the inverter by a digital control by means of the switching patterns S1, S3 and S5 of the inverter in the spatial vector control. The spatial vector modulation performs the calculation and the like in every defined sampling period Ts, and outputs the respective pulse widths and the timings in the switching patterns S1 to S6 to which the calculation result is transformed in the next sampling period Ts.

The spatial vector modulation generates the switching patterns S1 to S6 depending on the sector number that is obtained based on the target voltage vector V. In FIG. 14, in a case of the sector number #1 (n=1), one example of the switching patterns S1 to S6 of the inverter is shown. The signals S1, S3 and S5 show the gate signals of the switching devices Q1, Q3 and Q5 that are corresponding to the upper-arm. The horizontal axis denotes a time, and the sampling period Ts is corresponding to the switching period and is divided into eight periods, T0/4, T1/2, T2/2, T0/4, T0/4, T2/2, T1/2 and T0/4. The periods T1 and T2 are the time depending on the sector number "n" and the rotational angle "γ".

Figure 15:
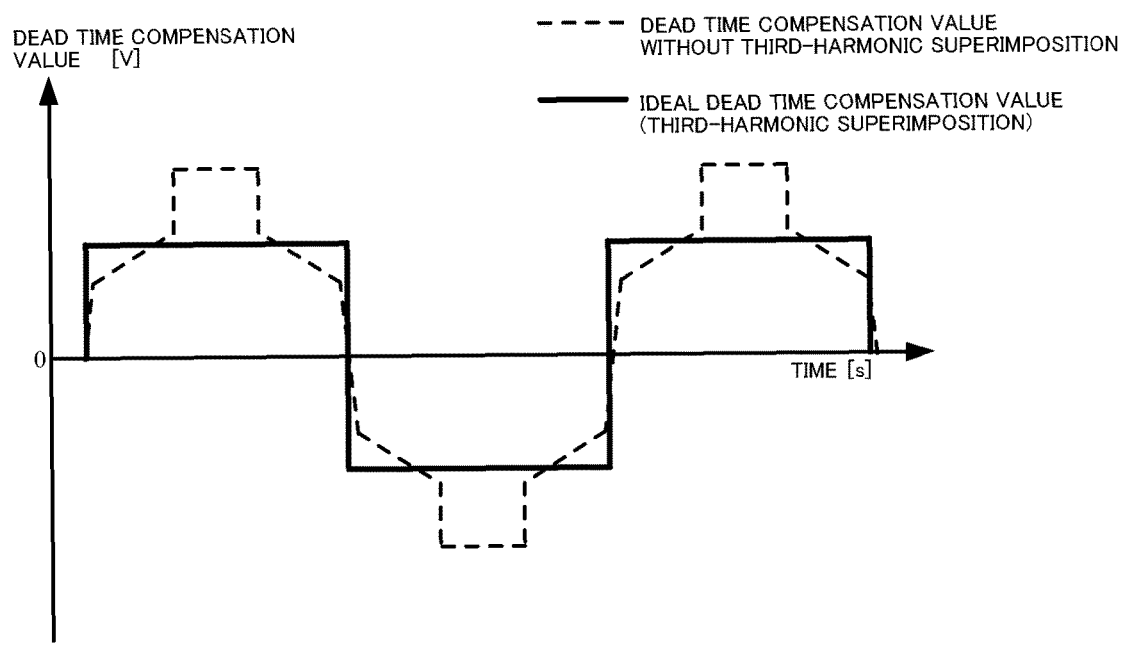
FIG. 15 is a waveform chart showing an effect of the spatial vector modulation.

In a case that the spatial vector modulation is not performed, the dead time compensation of the present invention is applied on the dq-axes, and the dead time compensation value waveform (the U-phase waveform) that the dq-axes/3-phase convertion is performed to only the dead time compensation value is shown in a waveform represented by a dashed line of FIG. 15 that the third-order component is removed. The same phenomena are exhibited in the V-phase and the W-phase. By applying the spatial vector modulation instead of the dq-axes/3-phase conversion, the third-harmonic can be superimposed on the 3-phase signals, the third-order component that is removed by the 3-phase conversion can be compensated, and the ideal dead time compensation waveform that is shown in a solid line of FIG. 15 can be generated.

Figure 16:
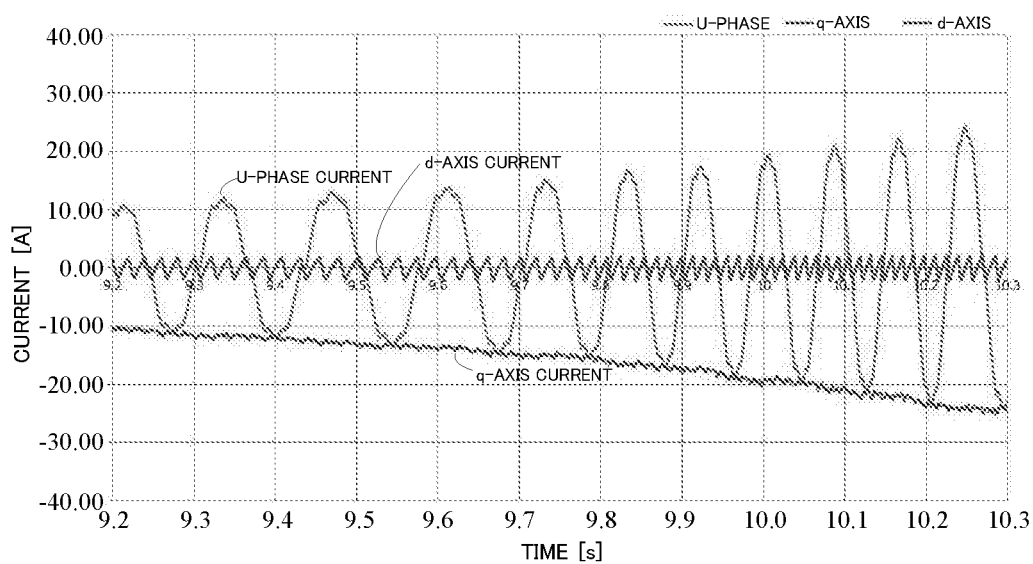
FIG. 16 is a waveform chart showing an effect of the present invention (the first embodiment)
Figure 17:
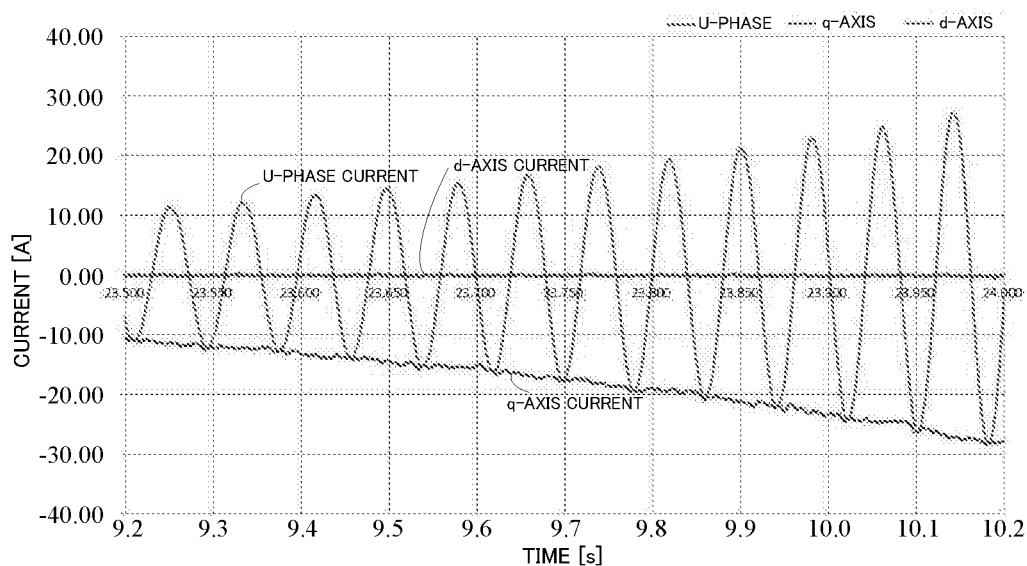
FIG. 17 is a waveform chart showing an effect of the present invention (the first embodiment)

FIGS. 16 and 17 are simulation results showing an effect of the present invention (the first embodiment). FIG. 16 shows the U-phase current, the d-axis current and the q-axis current in a case that the dead time compensation is not performed. By applying the dead time compensation of the present invention, in the high-speed steering state, the improvements in the waveform distortion of the phase currents and the dq-axes currents as shown in FIG. 17 (the ripple is reduced in the dq-axes current waveforms and the phase currents whose waveforms are almost sinusoidal are obtained) can be confirmed. The torque ripple in the steering maneuver and the steering sound are improved.

As well, FIGS. 16 and 17 typically show the U-phase current.

Next, the second embodiment that the compensation is performed by adding (feedforwarding) the dead time compensation values based on the estimated compensation signs to the 3-phase voltage command values will be described with reference to FIG. 18 corresponding to FIG. 5.

Figure 18:
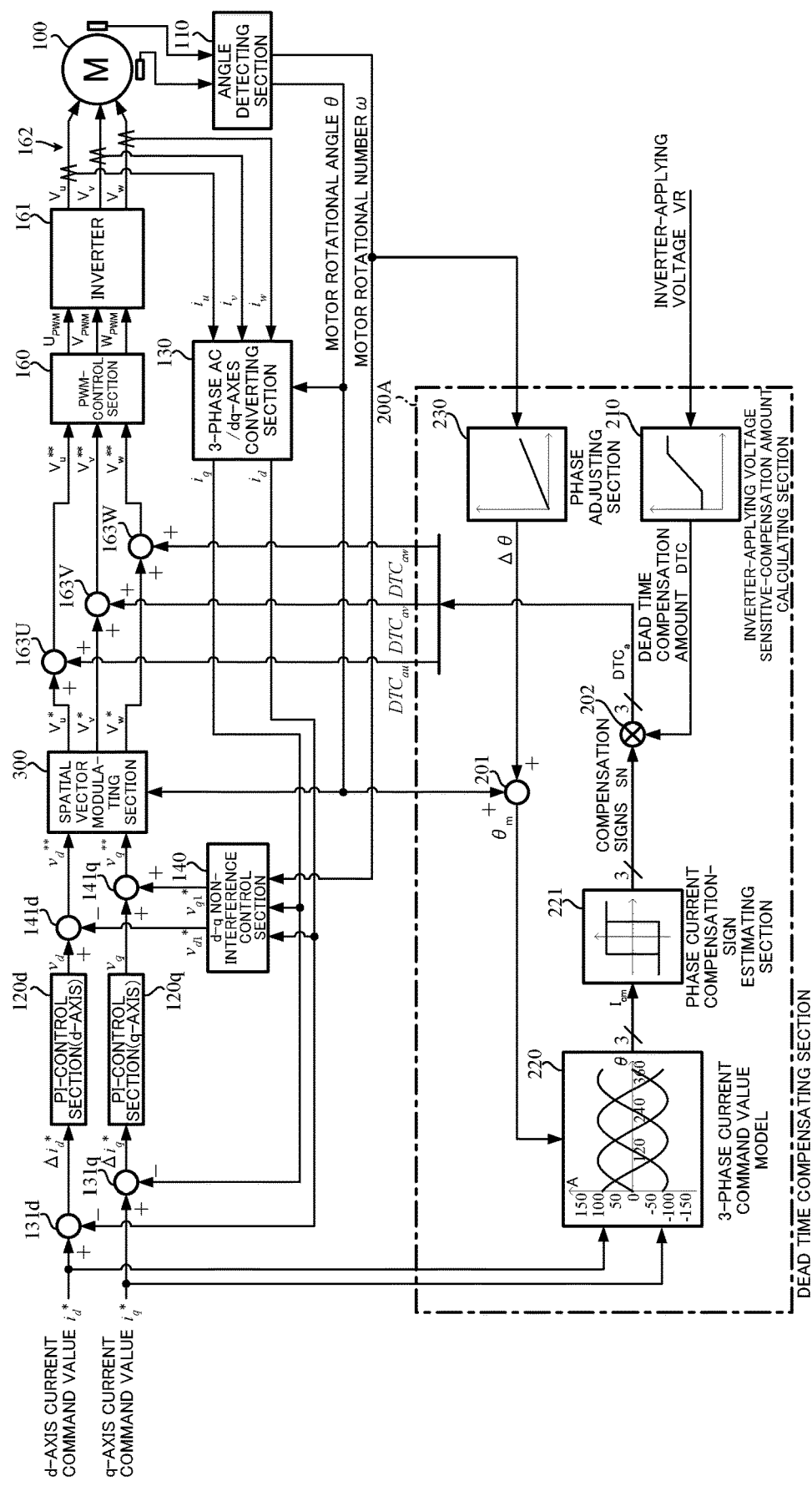
FIG. 18 is a block diagram showing a configuration example (the second embodiment) of the present invention.

In the second embodiment as shown in FIG. 18, the dead time compensating section 200A does not include the 3-phase AC/dq-axes converting section. Thus, the adding sections 121d and 121q are not included. In the second embodiment, in order to add (feedforward) the dead time compensation values based on the estimated compensation signs to the 3-phase voltage command values, adding sections 163U, 163V and 163W are disposed between the spatial vector modulating section 300 and the PWM-control section 160. The 3-phase dead time compensation values DTCa (DTCau, DTCav and DTCaw), which the compensation signs SN are multiplied with the dead time compensation amount DTC, are inputted into the adding sections 163U, 163V and 163W, respectively. The voltage command values $V_u^{}$, $V_v^{}$ and $V_w^{**}$, which the dead time compensation values are added and the dead time compensation is performed, are inputted into the PWM-control section 160. The subsequent control operation is the same as described above.

Figure 19:
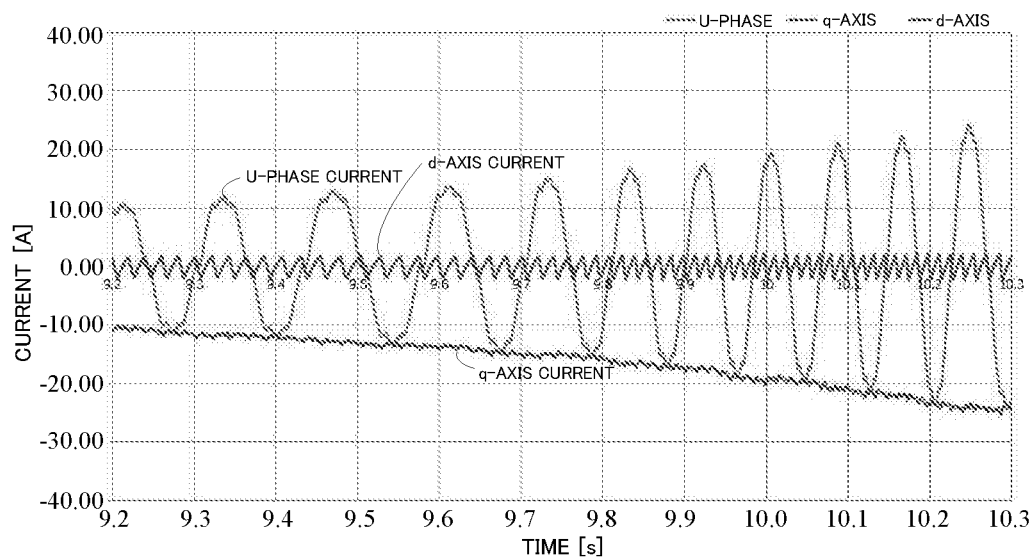
FIG. 19 is a waveform chart showing an effect of the present invention (the second embodiment)
Figure 20:
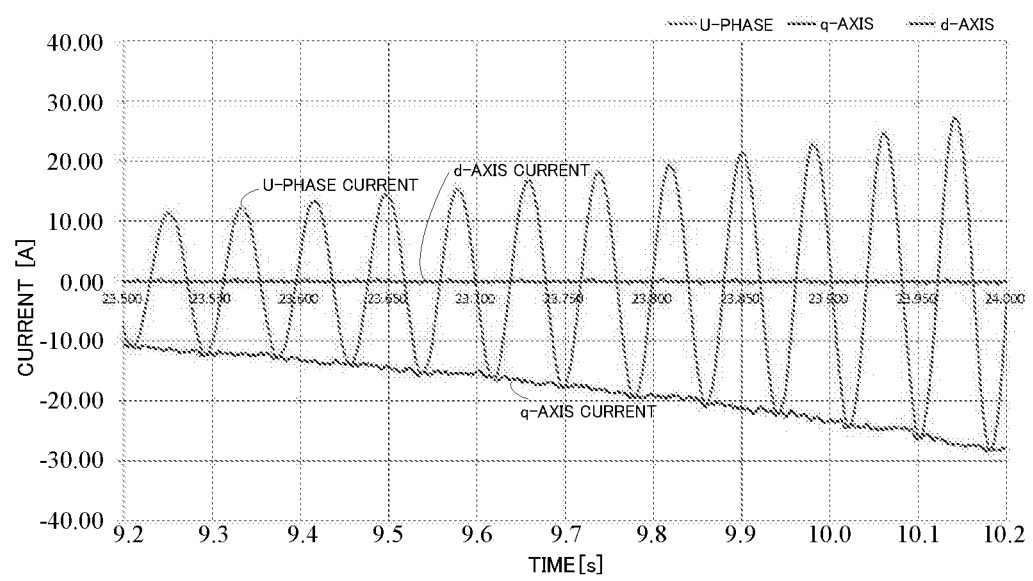
FIG. 20 is a waveform chart showing an effect of the present invention (the second embodiment).

The inverter-applying voltage sensitive-compensation amount calculating section 210, the 3-phase current command value model 220, the phase current compensation-sign estimating section 221 and the phase adjusting section 230 have the same characteristics and the same operations as the first embodiment. The effect of the second embodiment is shown in FIGS. 19 and 20. As well, FIGS. 19 and 20 typically show the U-phase current.

EXPLANATION OF REFERENCE NUMERALS 1 handle (steering wheel)
2 column shaft (steering shaft, handle shaft)
10 torque sensor
12 vehicle speed sensor
13 battery
20, 100 motor
30 control unit (ECU)
31 steering assist command value calculating section
35, 203, 204 PI-control section
36, 160 PWM-control section
37, 161 inverter
110 angle detecting section
130 3-phase/dq-axes converting section
140 d-q non-interference control section
200, 200A dead time compensating section
210 inverter-applying voltage sensitive-compensation amount calculating section
220 3-phase current command value model
221 phase current compensation-sign estimating section
230 phase adjusting section
240 3-phase AC/dq-axes converting section
300 spatial vector modulating section
301 2-phase/3-phase converting section
302 third-harmonic superimposition section

The invention claimed is:

1. An electric power steering apparatus of a vector control system that converts dq-axes current command values calculated based on at least a steering torque into 3-phase duty command values, driving-controls a 3-phase brushless motor by an inverter of a pulse width modulation (PWM) control, and applies an assist torque to a steering system of a vehicle,
wherein compensation signs of 3-phase current model command values in which said dq-axes current command values are converted into a 3-phase current command value model are estimated,
wherein a dead time compensation amount is calculated based on an inverter-applying voltage, and
wherein a dead time compensation of said inverter is performed by adding dead time compensation values that are 2-phase values converted from 3-phase values in which said compensation signs are multiplied with said dead time compensation amount, to dq-axes voltage command values.

2. The electric power steering apparatus according to claim 1, wherein a motor rotational angle is used in conversions of said 3-phase current model command values and said dead time compensation amount.

3. The electric power steering apparatus according to claim 2,
wherein a relationship between said inverter-applying voltage and said dead time compensation amount is that said dead time compensation amount is a first dead time compensation amount being a constant when said inverter-applying voltage is equal to or lower than a predetermined voltage VR1, said dead time compensation amount is a second dead time compensation amount increasing when said inverter-applying voltage is higher than said predetermined voltage VR1 and is equal to or lower than a predetermined voltage VR2 which is higher than VR1, and said dead time compensation amount is a third dead time compensation amount being a constant when said inverter-applying voltage is higher than said predetermined voltage VR2.

4. An electric power steering apparatus of a vector control system that converts dq-axes current command values calculated based on at least a steering torque into 3-phase voltage command values, calculates duty command values based on said 3-phase voltage command values, driving-controls a 3-phase brushless motor by an inverter of a pulse width modulation (PWM) control, and applies an assist torque to a steering system of a vehicle,
wherein compensation signs of 3-phase current model command values in which said dq-axes current command values are converted into a 3-phase current command value model are estimated, wherein a dead time compensation amount is calculated based on an inverter-applying voltage, and wherein a dead time compensation of said inverter is performed by adding 3-phase values that said compensation signs are multiplied with said dead time compensation amount, to said 3-phase voltage command values.

5. The electric power steering apparatus according to claim 4, wherein a motor rotational angle is used in conversions of said 3-phase current model command values and said dead time compensation amount.

6. The electric power steering apparatus according to claim 5, wherein a phase adjustment is performed by changing a phase of said motor rotational angle depending on a motor rotational velocity.

7. The electric power steering apparatus according to claim 6, wherein said 3-phase current model command value is calculated from said dq-axes current command values and a calculation or a table.

8. The electric power steering apparatus according to claim 4, wherein a relationship between said inverter-applying voltage and said dead time compensation amount is that said dead time compensation amount is a first dead time compensation amount being a constant when said inverter-applying voltage is equal to or lower than a predetermined voltage VR1, said dead time compensation amount is a second dead time compensation amount increasing when said inverter-applying voltage is higher than said predetermined voltage VR1 and is equal to or lower than a predetermined voltage VR2 which is higher than VR1, and said dead time compensation amount is a third dead time compensation amount being a constant when said inverter-applying voltage is higher than said predetermined voltage VR2.

9. An electric power steering apparatus of a vector control system that converts dq-axes current command values calculated based on at least a steering torque into 3-phase duty command values, driving-controls a 3-phase brushless motor by an inverter of a pulse width modulation (PWM) control, and applies an assist torque to a steering system of a vehicle, comprising:

an inverter-applying voltage sensitive-compensation amount calculating section to calculate an each phase dead time compensation amount based on an inverter-applying voltage;

a 3-phase current command value model to calculate a 3-phase current model command values based on said dq-axes current command values;

a phase current compensation-sign estimating section to estimate compensation signs of said 3-phase current model command values; and a dead time compensation value outputting section to output dead time compensation values by multiplying said compensation signs with said each phase dead time compensation amount and by converting said multiplied values into dq-axes, wherein a dead time compensation of said inverter is performed by adding said dead time compensation values to dq-axes voltage command values.

10. The electric power steering apparatus according to claim 9, wherein said dead time compensation value outputting section comprises:

a multiplying section to multiply said compensation signs with said dead time compensation amount; and a 3-phase alternating current (AC)/dq-axes converting section to convert 3-phase outputs of said multiplying section into said dead time compensation values on dq-axes.

11. An electric power steering apparatus of a vector control system that converts dq-axes current command values calculated based on at least a steering torque into 3-phase voltage command values, calculates duty command values based on said 3-phase voltage command values, driving-controls a 3-phase brushless motor by an inverter of a pulse width modulation (PWM) control, and applies an assist torque to a steering system of a vehicle, comprising:

an inverter-applying voltage sensitive-compensation amount calculating section to calculate an each phase dead time compensation amount based on an inverter-applying voltage;

a 3-phase current command value model to calculate a 3-phase current model command values based on said dq-axes current command values;

a phase current compensation-sign estimating section to estimate compensation signs of said 3-phase current model command values; and a dead time compensation value outputting section to output 3-phase dead time compensation values in which said compensation signs are multiplied with said each phase dead time compensation amount, wherein a dead time compensation of said inverter is performed by adding said dead time compensation values to said 3-phase voltage command values.

* * * * *